Oct. 19 1948.  E. C. SUYDAM  2,451,638
PHOTOGRAPHIC PLATE AND FILM HOLDER
Filed March 27, 1947  3 Sheets-Sheet 1
FIG. 1.
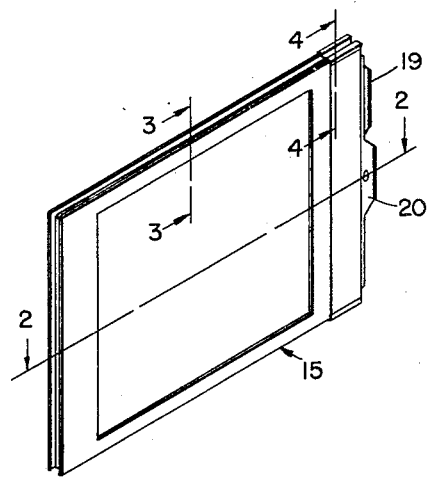
FIG. 2.
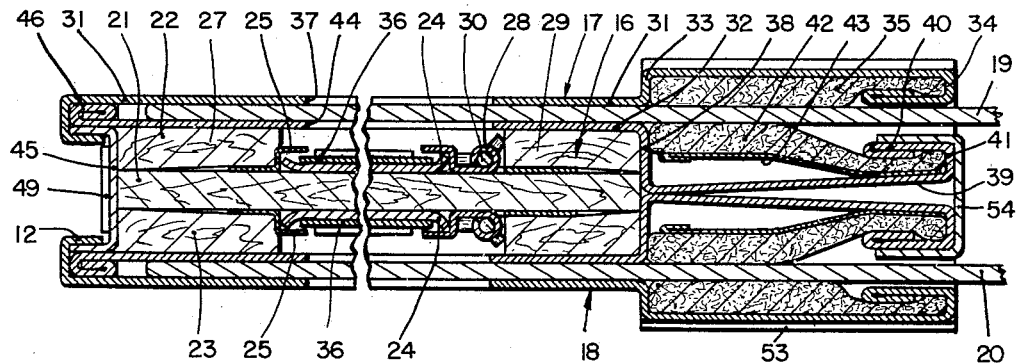
FIG. 3.   FIG. 4.
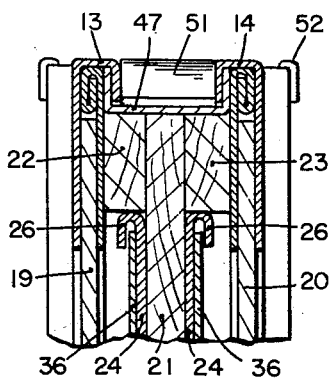 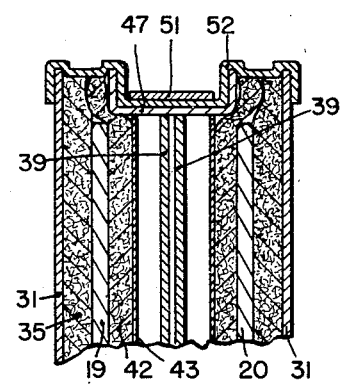
INVENTOR
EDWARD C. SUYDAM
BY
ATTORNEYS Oct. 19 1948. E. C. SUYDAM 2,451,638
PHOTOGRAPHIC PLATE AND FILM HOLDER
Filed March 27, 1947 3 Sheets-Sheet 2

INVENTOR
EDWARD. C. SUYDAM
BY
ATTORNEYS

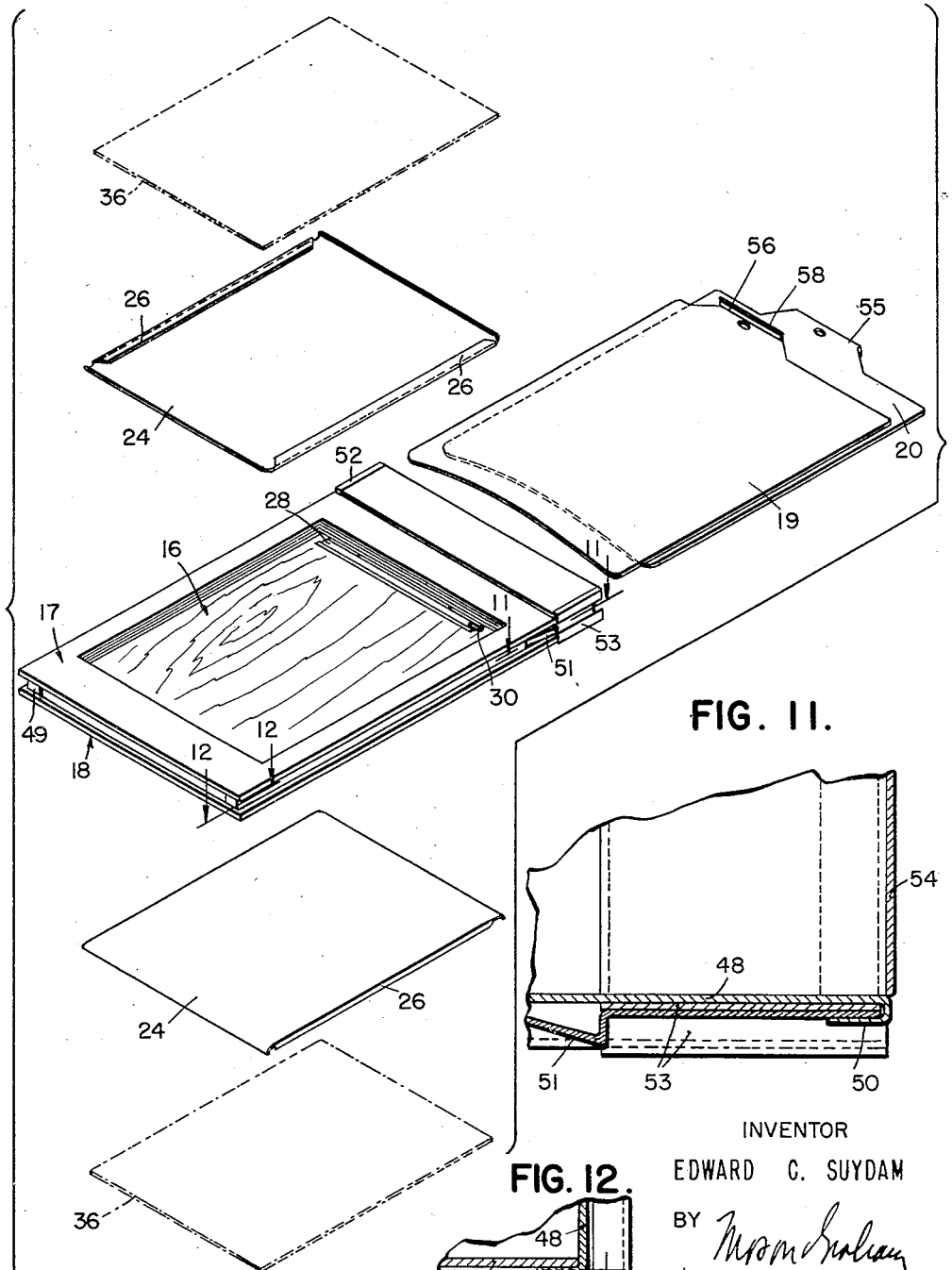

Patented Oct. 19, 1948

2,451,638

UNITED STATES PATENT OFFICE 2,451,638

PHOTOGRAPHIC PLATE AND FILM HOLDER

Edward C. Suydam, Los Angeles, Calif.

Application March 27, 1947, Serial No. 737,537

3 Claims. (Cl. 95—66)

The present invention relates to a photographic plate or film holder, and more particularly to a double plate or film holder for photographic still cameras, of the sliding or European type back category.

In general, there are two basic types of cameras which are adapted to use plates or cut film. One of these types has been in use for a number of years in America, and in it the back of the camera may be sprung outwardly to receive the film holder between it and the body of the camera. The focal plane is located about one-eighth inch from the rear surface of this American type camera. In such cameras it is common practice to use a wooden frame, double plate holder, wherein dark slides are inserted in slots cut in the upper end of the wooden frame to protect the plates or cut film from light.

The other type of camera commonly is referred to as of the "European type back." This latter type, as the name implies, originated in Europe, and commonly takes a film or plate size of 9 x 12 centimeters. They have channeled guides along the two slides and lower edge of the rear opening and a film pack or single plate or cut film holder is adapted to be inserted slidably in these channels alternately with a ground glass focusing back, a film pack adapter or a simple back closure plate. In these European type back cameras the focal plane is located approximately .050 inch from the rear surface of the camera. The plate or film holders ordinarily provided for these cameras comprise a single die pressed sheet metal slide holder and dark slide with means for retaining a plate or cut film therein. Usual light seals are provided so that a plate or cut film therein can be protected from the light by the slide until ready for exposure.

An object of the present invention is to make an improved and simplified double cut film and plate holder.

Another object is to make a double cut film or plate holder by assembling a plurality of simple preformed metal shapes.

Another object is to make a cut film or plate holder by assembling a plurality of simple, interlocking, light, sheet metal shapes around a non-metallic block type core assembly.

Another object is to make a double cut film or plate holder having a plurality of light, simply formed sheet metal shapes assembled in mutually interlocking relation over a non-metallic core with improved film retaining and light trapping arrangement.

In order to attain these objects there is provided in accordance with one feature of the invention a central core assembly having a central plate with a marginal frame surrounding a central area on both faces thereof to provide a pair of shallow film and plate receiving recesses on opposite sides thereof. A pair of dark slide holders are mounted one on each of the two sides of the central core assembly. Novel interlocking channel and other arrangements secure the parts together and provide a light tight sealed enclosure around the central assembly. Light traps are formed in an end of each slide holder by offsetting the end portions of elements which combine to form the slide holders and by mounting spring pressed felt wipers in these offset end portions.

These and other objects and advantages of the invention will be brought out more fully in the following description and the accompanying drawings, wherein:

Fig. 1 is a view in perspective of a double plate and cut film holder embodying the present invention;

Fig. 2 is an enlarged sectional view taken on the line 2—2 of Fig. 1, a central portion of the holder being broken away to increase the scale of the drawing;

Fig. 3 is a fragmentary sectional view on the line 3—3 of Fig. 1;

Fig. 4 is a fragmentary sectional view taken on line 4—4 of Fig. 1;

Fig. 10 is an exploded view showing the various assemblies and major elements of the film holder separated from each other, two pieces of cut film adapted to be inserted in a cut film holder being indicated in dotted lines;

Fig. 11 is an enlarged fragmentary sectional view taken on the line 11—11 of Fig. 10; and Fig. 12 is a similar view taken on line 12—12 of Fig. 10.

Figure 5:
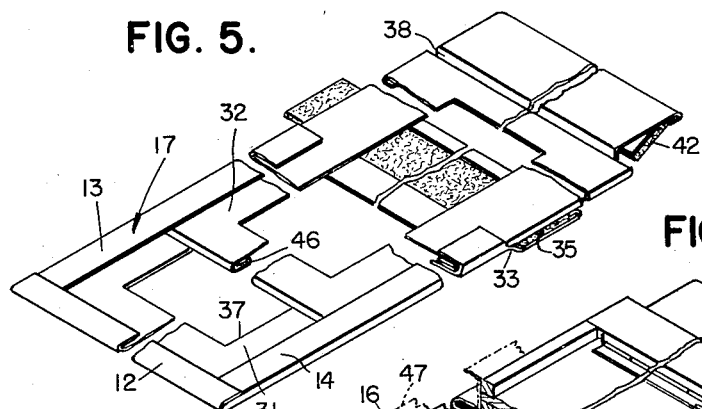
Fig. 5 is a fragmentary view in perspective of the parts comprising a slide holder, shown removed from the film holder assembly and in partially disassembled relation, intermediate parts being broken away to permit increasing the scale of the drawing.
Figure 6:
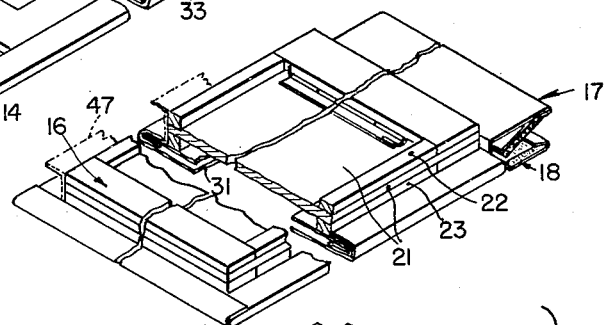
Fig. 6 is a view similar to Fig. 5, showing a slide holder assembly in fully assembled condition and mounted on one side of a central wooden plate and film holding core assembly.

Referring to the drawings in detail, a cut film or plate holder 15 embodying the present invention comprises a double recessed central core member 16, a pair of slide holders 17 and 18 which are mounted one on each side of the core member. A pair of dark slides 19 and 20 are adapted to be inserted in the slide holders. The arrangement of the slide holders and the structure whereby they are incorporated with the central core member comprises an important feature of the invention.

The core member may be of wood, and preferably is constructed with a planiform rectangular central plate 21 having rectangular marginal frames 22 and 23 secured one to each side thereof to provide a rectangular recess in each side of the core assembly thus formed. These recesses are adapted to receive a usual photographic plate or cut film holder 24 of the required size. The cut film holder has marginal flanges 26 to retain the edges of a piece of cut film 36 when inserted therein.

An offset or Z-shaped strip 25 of metal has its lower flange inserted between the central core element 21 and a bottom transverse frame member 27, as illustrated in Fig. 2, to receive and retain the lower edge of a plate or cut film holder 24 inserted beneath it. A spring pressed hinge clip 28 has its upper flange inserted between the central core element 21 and an upper transverse core frame member 29. The hinge clip 28 may be raised manually to permit inserting the plate or film holder in the recess in the core, after which the clip is released to permit a spring 30 to force it into plate or film retaining position.

The slide holders 17 and 18 for the dark slides 19 and 20 may be identical, and a description of one only, therefore, will be sufficient. The slide holder 17, as best shown in Fig. 5, comprises a plate 31 and an insert 32. The plate 31 is of thin sheet metal and has reversely folded marginal side and bottom portions 12, 13 and 14. These marginal portions are spaced from the body portion of the plate a sufficient distance slidably to receive the insert 32 therein. The upper portion of the plate 31 is offset outwardly, as at 33 in Fig. 2. The upper marginal edge portion 34 of the plate 31 is hemmed and then reversely folded to overlie a light seal comprising a strip 35 of felt which is of a width to fit between the offset 33 and the folded upper edge portion 34. Preferably after the plate member 31 has been formed and the felt strip 35 inserted as described, a rectangular opening 37 is punched in the plate of a size determined by the size of plate or film to be employed.

The insert 32 also is formed of thin sheet metal and the sides and lower edges thereof are doubly hemmed, as best shown at 46 in Fig. 2. The upper end of the insert member is offset inwardly as at 38, the portion above the offset being bent outwardly at a slightly acute angle, as at 39 (Fig. 2). The upper edge of the offset portion is hemmed, as at 40 and then is folded over as at 41 to grip the upper edge of a second light seal comprising a strip 42 of felt. A strip 43 of light spring material, such as spring brass is inserted beneath the felt strip 42. The upper edge of the spring strip 43 is also inserted beneath the folded upper edge portion 41 of the insert 32. Preferably after forming the insert 32 a rectangular opening 44 is punched therein to register with the opening 37 in the plate 31 when these parts are assembled.

After assembling the felt strip 42 and the spring 43 with the insert 32, and before the insert is assembled with the plate 31, the felt strip 42 is raised, and a light coating of glue is applied to the thus exposed face of the spring strip 43 so as to hold the felt securely thereon. The insert 32 then is inserted slidably beneath the hemmed sides and bottom of the plate 31, in the manner illustrated in Fig. 5, a thin sheet of smooth material, such as a slide 19, preferably being inserted between the felt strips 35 and 42 as they are slid into assembled relation to avoid pulling the felts out of position.

Figure 7:
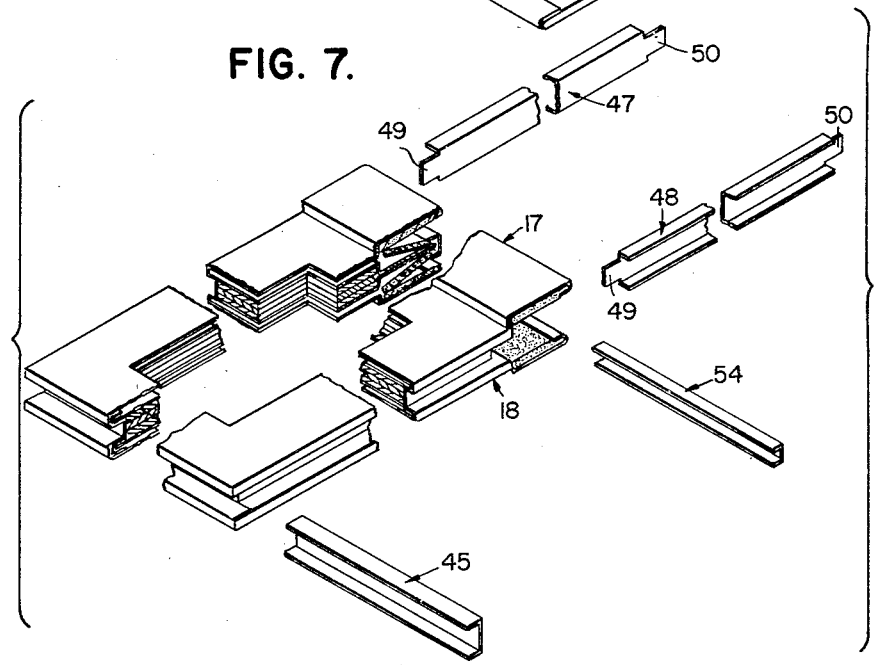
Fig. 7 is a similar view of the complete film holder assembly with some of the parts shown as they would appear removed from the assembly and the central core assembly shown as cut away to show the structure of the various parts.
Figure 8:
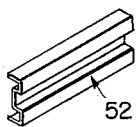
Fig. 8 is a similarly enlarged view in perspective of a light seal.

In order to assemble the slide holders 17 and 18 on the two faces of the core assembly 16, a channeled bottom strip 45 is assembled with its side flanges inserted beneath the reversely folded lower edge portions 12 of the plates 31, as shown in Fig. 2. Side channeled strips 47 and 48 (see Figs. 3 and 7) also are inserted with their side flanges beneath the reversely folded side portions 13 and 14 of the plates 31. The channeled side strips 47 and 48 are provided with endwise extending tabs 49 and 50 at the ends thereof. The lower end tabs 49 are folded over to lie in the channel of the bottom channeled strip 45.

The side and bottom channeled strips 45, 47 and 48 fit closely around the sides and bottom of the core member 16. After assembly, the side and bottom marginal flanges of the plate 31 are squeezed in a suitable machine, such as a press or brake, to grip the channel flanges and the marginal edge portions of the insert 32 to hold the parts in assembled condition.

Figure 9:
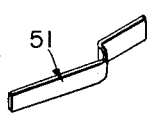
Fig. 9 is a similar view in perspective of a latch engaging clip member.

The tabs 50 at the upper end of the side channeled strips 47 and 48 are folded outwardly and downwardly in the form of a reverse bend, and a latch clip 51 (see Fig. 9) has its upper end, which is the right hand end, as illustrated in Fig. 9, inserted beneath this downwardly folded tab, as shown in Fig. 11. The clips 51 provide a step on each side of the device to engage a latch (not shown) which commonly is provided on European type back cameras to retain a plate or film holder on the camera.

A pair of short channel members 52 and 53 are mounted over the outer ends of the offset upper portions of the assembled slide holders to seal these ends against the entrance of light, and to enclose the ends of the felt strips which otherwise would be exposed. The latch clips 51, and the short channel members 52 and 53 are soldered lightly in place to the slide assemblies and to the side channels.

A top channeled sealing strip 54 (see Figs. 2 and 7) is applied over the upper ends of the two slide insert members 32 to seal the opening which otherwise would be exposed between these upper ends.

The pair of dark slides 19 and 20 may be of sheet metal. These slides preferably are approximately twice the thickness of the material of which the insert 32 is formed so that the double marginal hem of the insert serves as a spacer properly to separate the body of the insert from that of the plate 31. One of the slides has a tab 55 centrally thereof and the other slide has a tab 56 at one side thereof. The upper marginal edge portion 58 of each of the tabs is bent to lie at right angles to the tab. These tabs are for manipulating the slides, and when made in this manner are offset from each other regardless of whether the slides are positioned with their top flanges facing inwardly or outwardly. The position of these top flanges 58 ordinarily is used by photographers to indicate whether or not the plate or a cut film beneath it has been exposed. For example, the flange may be positioned outwardly for "unexposed," and inwardly for "exposed."

The corner junctures of the metal parts surrounding the core 16 preferably are lightly soldered together except where the metal is well fitted together or overlapping so as to insure against light leaks without soldering. It is recommended that the soldering iron be hot so that the solder will flow smoothly into the joints and not form unsightly lumps.

All exposed corners of the device are rounded off slightly to avoid scratching the operator or equipment when using the holders in a dark room, and also to improve their appearance. All of the exposed parts of the holder, slides and core preferably are painted black, the exterior surfaces preferably being painted with a baking type enamel so as to provide a durable finish.

The double holder of the present invention is capable of easy manufacture with a minimum amount of tooling up and without the need of expensive dies. It provides an entirely new type of double plate holder for European back type cameras which has found an immediate demand among owners of this type of comera. The holders are equally well adapted to the use of both plates and cut film, and are much more convenient to handle than the older, single type holders which previously have been employed, and which are relatively more difficult and expensive to manufacture. The wooden core is well sealed against moisture and there is no tendency for it to bulge or warp, even under severe conditions of moisture.

While I have illustrated and described a preferred form of my invention, it is to be understood that variations will occur to those familiar with the art and it is desired, therefore, not to limit the invention except as set forth in the following claims.

I claim:

1. A double plate and film holder comprising a central core member having a pair of rectangular recesses in opposite sides thereof, means for retaining a photographically sensitized member in each of said recesses, a slide holder mounted on each side of said core member, each slide holder comprising a receiving member having a rectangular opening therein, inwardly folded side and bottom marginal edge portions on said receiving member, an offset upper end portion on said receiving member with a top marginal flange, a felt sealing strip mounted between the top marginal flange and the bottom of said offset upper end portion and gripped by the top marginal flange, an insert formed substantially similarly to said receiving member and disposed oppositely thereto, said insert having a flanged upper edge portion, a film sealing strip with spring backing gripped beneath said flanged upper edge portion, said insert being slidably inserted within the inwardly folded marginal portions of said receiving member, channel members mounted on the sides and bottom of said core member, the flanges of the channels thereof facing outwardly and being inserted in the inwardly folded marginal edge portions of said receiving members, latch clips mounted on the sides of said film holder, channels enclosing the ends of said offset portions and said film strips, a channel overlying the upper ends of said inserts, and a dark slide slidably insertable between each receiving member and its associated insert to overlie the recess in one side of said core member.

2. A double plate and film holder for European type back cameras, comprising a central core member having a pair of rectangular recesses in opposite sides thereof, means for retaining a photographically sensitized member in each of said recesses, a slide holder mounted on each side of said core member, each slide holder comprising a receiving member having a rectangular opening therein and having inwardly folded side and bottom marginal edge portions on said receiving member, and an offset upper end portion with a top marginal flange, marginal edge portions of said receiving member being adapted to fit into a European type back camera, a felt sealing strip gripped beneath said top marginal flange, an insert formed substantially similarly to said receiving member and disposed oppositely thereto, marginal spacing means disposed between the sides and bottom of the receiving member and the insert, said insert having a flanged upper edge, a film sealing strip with spring backing gripped beneath said flanged upper edge, said insert being slidably inserted within the marginal inwardly folded portions of said receiving member, channel members mounted on the sides and bottom of said core member, the flanges of the channels thereof facing outwardly and being inserted in the hemmed marginal edge portions of said receiving members, a channel overlying the upper ends of said inserts and a pair of dark slides slidably insertable between each receiving member and its associated insert to overlie the recess in one side of said core member.

3. A double plate and film holder for European type back cameras, comprising a central core member having a pair of rectangular recesses in opposite sides thereof, means for retaining a photographically sensitized member in each of said recesses, a slide holder mounted on each side of said core member, each slide holder having side and bottom marginal edge portions extending beyond said core and adapted to fit into a European type back camera, said slide holders each comprising a first planiform frame member having a rectangular opening therein, a second planiform frame member formed substantially similarly to said first frame member and disposed oppositely thereto, said second frame member having narrow, double flanged, side and bottom marginal edge portions to space the second from the first planiform frame member, securing means adapted to secure the first to the second planiform frame member, strip means mounted around the sides and bottom of said core member, said strip means having interlocking engagement with said slide holders, a latch clip mounted on a side of said film holder, a light seal mounted across the upper end of each slide holder, closure means mounted between the upper ends of said slide holder, and a pair of dark slides slidably insertable in each slide holder to overlie the recess in one side of said core member.

EDWARD C. SUYDAM.

REFERENCES CITED

The following references are of record in the file of this patent:

UNITED STATES PATENTS

| Number | Name | Date |
| --- | --- | --- |
| 711,741 | Schuttauf | Oct. 21, 1902 |
| 766,869 | Borsum | Aug. 9, 1904 |
| 2,056,144 | Roth | Sept. 29, 1936 |